June 25, 1968            R. L. CREMER            3,389,497
PLASTIC AXLE BEARINGS FOR USE ON TOY VEHICLES
Filed Dec. 28, 1965            2 Sheets-Sheet 1
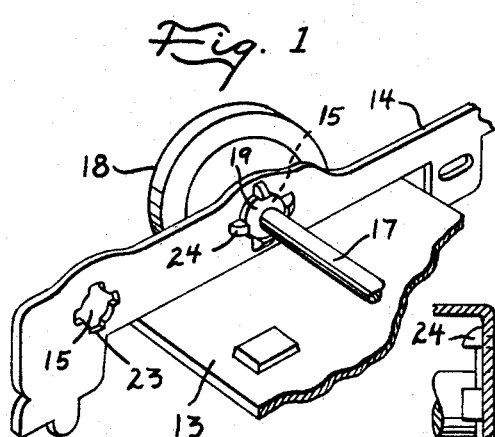
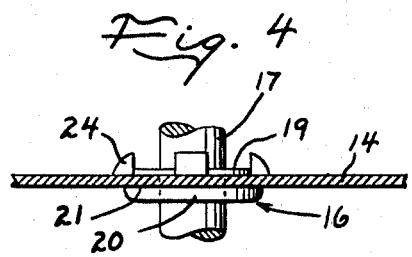
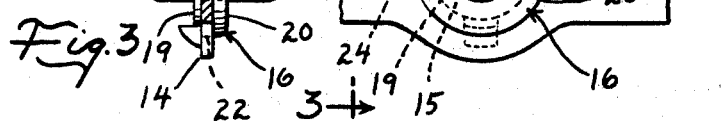
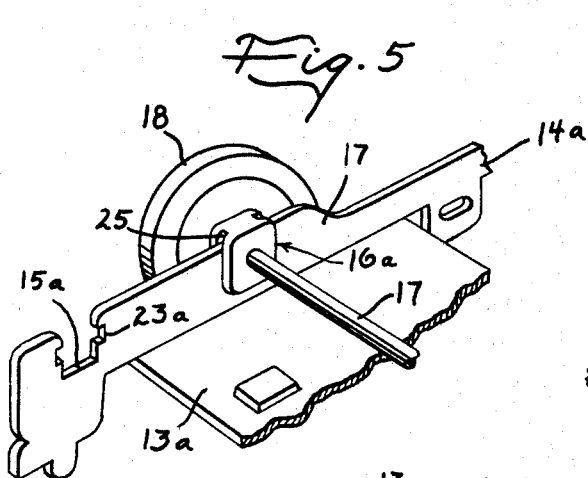
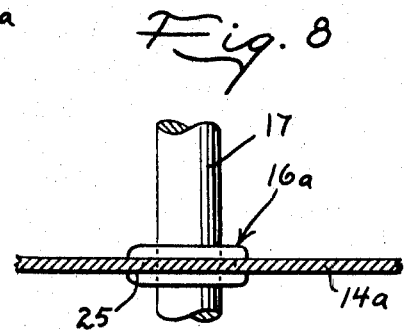
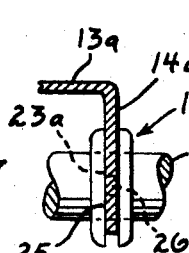
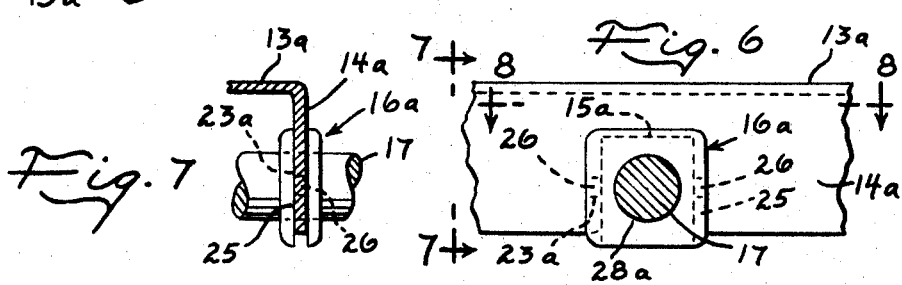
INVENTOR
ROBERT L. CREMER
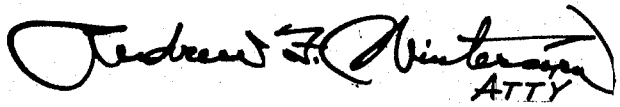
ATTY June 25, 1968 R. L. CREMER 3,389,497
PLASTIC AXLE BEARINGS FOR USE ON TOY VEHICLES
Filed Dec. 28, 1965 2 Sheets-Sheet 2
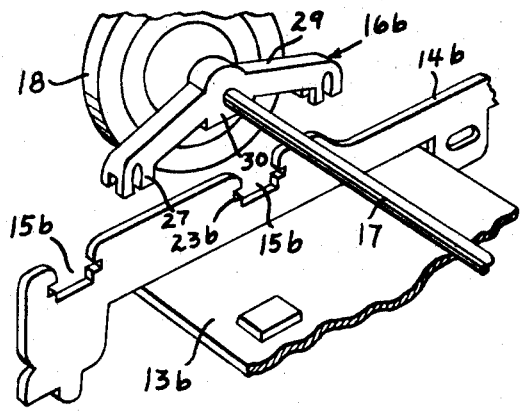
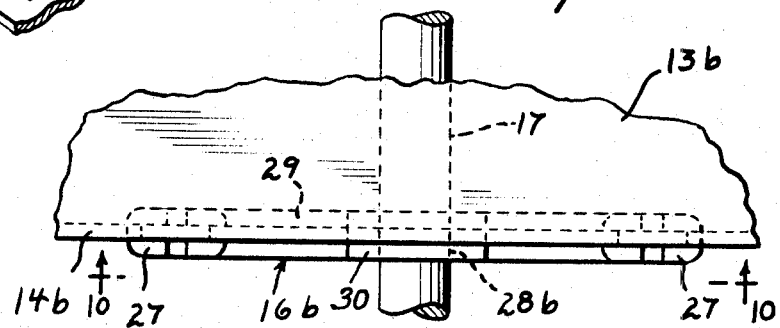
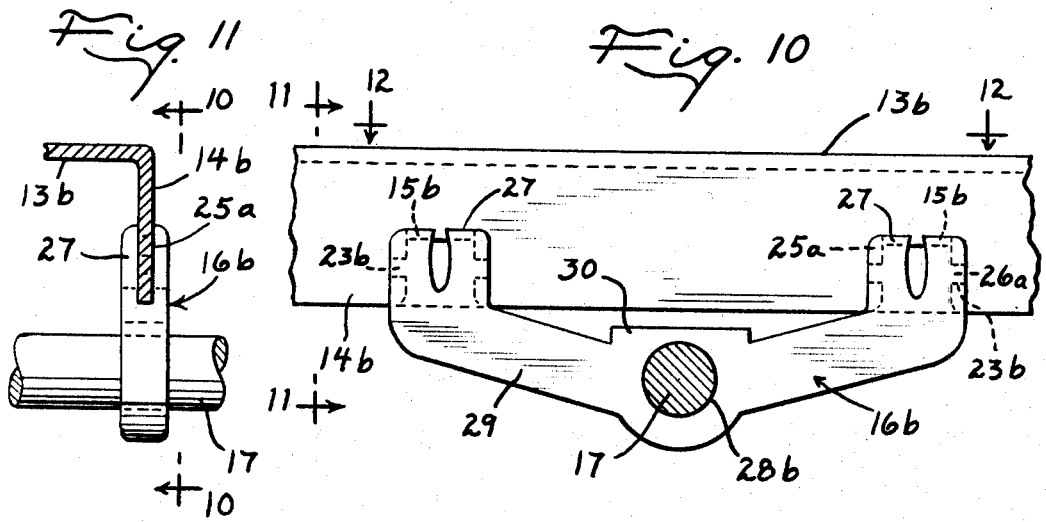
INVENTOR
ROBERT L. CREMER
ATTY.

United States Patent Office 3,389,497
Patented June 25, 1968

3,389,497
PLASTIC AXLE BEARINGS FOR USE
ON TOY VEHICLES
Robert L. Cremer, Freeport, Ill., assignor to King-Seeley
Thermos Co., Ann Arbor, Mich., a corporation of
Michigan
Filed Dec. 28, 1965, Ser. No. 516,961
8 Claims. (Cl. 46—221)

This invention relates to plastic axle bearings for use on toy vehicles, the principal advantages derived therefrom being, first of all, greater durability; secondly, improved performance of the toys from the standpoint that there is no longer any tinny or metallic sounds given off when the wheels are banged onto the floor, and thirdly, in two of the three forms herein disclosed, these bearings may be assembled on the axles with the wheels before assembling the same on the chassis, or they may be applied, as in the third form, to the chassis before the axles are entered therein, although this latter procedure gives rise to the objection that at least one wheel has to be applied to the axle after the rest of the assembling is done.

The invention is illustrated in the accompanying drawings, in which—

FIG. 1 is a perspective view of a toy vehicle chassis, looking at the bottom thereof, showing one axle installed with the present improved type plastic snap-in bearings, this being the form in which the bearings are applied to the chassis first and then the axles are entered therein afterward;

FIGS. 2, 3, and 4 are, respectively, a side view, an edge-wise view, and a top view showing the bearing of FIG. 1 installed, FIGS. 3 and 4 being taken on lines 3—3 and 4—4 of FIG. 2;

FIG. 5 is a perspective view similar to FIG. 1 showing another form of plastic bearing of the kind that can be assembled on the axle before the wheels are applied, or, if preferred, they may be assembled on the chassis and the axle inserted therein as in the first form, the wheels being applied to the axle thereafter;

FIGS. 6, 7, and 8 are, respectively, a side view, an edgewise view, and a top view showing the bearing of FIG. 5 installed, FIGS. 7 and 8 being taken on lines 7—7 and 8—8 of FIG. 6;

FIG. 9 is a perspective view along the lines of FIG. 5 showing still another form of plastic bearing adapted to be assembled on the axle before the wheels are applied or, if preferred, assembled on the chassis and have the axle entered therein afterward, and FIGS. 10, 11, and 12 are, respectively, a side view, an edge-wise view, and a top view showing the bearing of FIG. 9 installed, FIGS. 11 and 12 being taken on lines 11—11 and 12—12 of FIG. 10.

Similar reference numerals are applied to corresponding parts throughout the views.

Referring to the drawings, and first to FIGS. 1 to 4, the reference numeral 13 designates the sheet metal chassis of a toy vehicle having longitudinally extending flanges 14 in spaced parallel relation along its opposite sides, in which cruciform holes 15 are provided in coaxial relationship transversely of the chassis to accommodate the plastic bearings 16 of my invention to mount the axles 17 on the chassis before the wheels 18 have been assembled on the ends thereof, or at least on one end. The plastic bearings 16 are not only cheaper than what were used previously but are far better as they actually upgrade the final toy vehicle considerably by virtue of their sound deadening action, getting away from the tinny or metallic sounds given by other toys, even the more expensive ones, when the wheels thereof are banged onto the floor.

The bearings 16 are of generally cylindrical form and preferably of flexible resilient polyethylene, although certain rubbers or any other similar resilient flexible plastic material may be used, it being important that the bearings be expansible and compressible radially so that when the outer cylindrical portion 19 of smaller diameter than the inner concentric cylindrical portion 20 is forced into the circular central portion of the holes 15 that is slightly undersize in relation to the diameter of the portion 19, the bearing will be compressed radially sufficiently to take hold frictionally, the annular shoulder 21 defined between the two portions 19 and 20 serving to limit axial movement of the bearing into the hole 15. The four equally circumferentially spaced radially projecting lugs 22 on the periphery of the reduced portion 19 fit closely in the four equally circumferentially spaced notches 23 around the hole 15 and are forced through these notches so that their enlarged outer ends 24 upon emerging on the outer side of the flange 14 anchor the bearing against outward displacement, inward displacement being prevented by the annular shoulder 21 previously mentioned.

In operation, the bearings 16 can be assembled in the holes 15 without any difficulty as, of course, prior to the entry of the axle 17 radial compression is much easier than it would be with the axle 17 entered in the bearings. The operator can easily snap a pair of bearings 16 into place from the inner side or outer side of the flanges 14, entry from the outer side being preferred because of the better appearance presented on that side. The lugs 22 must, of course, be aligned with the notches 23 and forced through the notches 23 at the same time that the reduced portion 19 of each bearing is pressed into the hole 15, the greater radial compressibility of the bearing before the axle is entered therein making the operation easier. Once the bearing 16 is inserted in the manner described and the axle 17 is inserted, a child is not apt to find it possible to remove the bearing, especially since the axle 17 reduces the bearing radial compressibility, and hence the bearings form a really permanent part of the toy. The sound deadening effect obtained with these plastic bearings is highly desirable and a welcome change from the tinny or metallic sounds previously given by even the more expensive toys, and yet these plastic bearings cost much less than bearings of the kinds previously used and are moveover more durable.

In the construction shown in FIGS. 5 to 8, the bearings 16a are preferably though not necessarily made of the same plastic material as bearings 16 for the same compressibility and resilience and are arranged to be snapped into place in slots 15a provided in the flanges 14a of chassis 13a, this method of assembly being of advantage in that the bearings 16a can be assembled on the axles 17 before the wheels 18 are applied to the opposite ends, and hence the axles will come to the assembly line with the bearings already assembled thereon and these will then be snapped into place in the flanges 14a to complete the assembling operation in a fraction of the time required with the other construction of FIGS. 1 to 4 just described. The bearings 16a are of square or rectangular form and grooved peripherally on three sides, as indicated at 25, to receive those portions of the flange 14a on three sides of the slot 15a, as clearly illustrated in FIG. 6, the grooves 25 being interrupted at the middle on opposite sides, as indicated at 26, to provide lugs of a size to fit fairly snugly in notches 23a provided in opposite sides of the slot 15a, whereby to anchor the bearing 16a in place against downward displacement, there being no danger of any axial displacement of the bearings 16a with respect to the axle 17 by reason of the way in which the flange 14a fits in the peripheral grooves 25 on the three sides of the bearing. The results obtained with this construction are similar to those obtained with the construction of FIGS. 1 to 4 and it is believed that this construction offers advantages over that one from the standpoint of lower costs of assembly and reduced costs from the standpoint that the bearings 16a as well as the wheels 18 can be assembled on the axle 17 before the axle comes to the assembly line.

Referring finally to the other bearings 16b disclosed in FIGS. 9 to 12, this is a delux type of bearing that will be made preferably though not necessarily of the same plastic material as bearings 16 and 16a previously described and gives the added function of a semi-elliptical spring when installed on the chassis 13b by snapping in its two square or rectangular upwardly projecting bosses 27 in the two U-shaped slots 15b provided therefor in longitudinally spaced relation in each flange 14b. The bearing 28b at the middle of the semi-elliptical spring portion 29 that interconnects the two bosses 27 rotatably receives the axle 17 in the same way as the bearing 28 of FIGS. 1 to 4 and bearing 28a in FIGS. 5 to 8, excepting, of course, that here the axle floats and is free to rise and fall in respect to the chassis as the leaf spring portion 29 is loaded due to weight or pressure applied on top of the chassis 13b. The rectangular projection 30 on the top of each bearing 28b serves by abutment with the bottom edge of the flanges 14b to limit flexing of the leaf spring portions 29. The bosses 27 are grooved vertically on both sides and across the top as indicated at 25a to receive the flanges 14b in the same way as in the case of the bearings 16a, and there are lugs 26a to enter notches 23b on opposite sides of the slots 15b to prevent downward displacement of the bosses from the slots. The results obtained with this bearing construction are similar to those obtained with the other two bearing constructions, the same advantages being offered in this one over that of FIGS. 1 to 4 as in that of FIGS. 5 to 8 from the standpoint that the bearings 16b as well as the wheels 18 can be assembled on the axle 17 before the axle comes to the assembly line. The leaf spring feature is, of course, a delux feature not present in either of the other two bearing constructions.

It is believed the foregoing description conveys a good understanding of the objects and advantages of my invention. The appended claims have been drawn to cover all legitimate modifications and adaptations.

I claim:

1. An axle bearing construction comprising in combination a bearing support, a bearing member of flexible, resilient, non-metallic bearing material having a circular hole provided therein for rotary bearing support of an axle extending therethrough in transverse relationship to said support, said support having an opening provided therein in which there are notches on diametrically opposite sides, and means on said bearing member engageable in said opening to mount the axle on said support, said means including diametrically opposed projections entered in said notches to prevent disengagement from said opening to mount said bearing member on said support while leaving said axle free to turn and move endwise relative to said bearing.

2. An axle bearing construction as set forth in claim 1 wherein the bearing member comprises a body of generally cylindrical form, the opening in said support being of circular form and of a diameter approximately the same as one portion of said body of reduced diameter received in said opening with a close fit, an annular shoulder being defined on said body next to said reduced portion for abutment by said body on one side of said support to limit axial movement of said body with respect to said opening in one direction, and said body having diametrically opposed radially projecting lugs received in said diametrically opposed notches to hold said body against turning with respect to said support, these lugs projecting through said notches and having enlarged outer end portions abutting the other side of said support alongside said opening to limit axial movement of said body with respect to said support in the other direction.

3. An axle bearing construction as set forth in claim 1 wherein the bearing member comprises a body of generally rectangular form, the opening in said support being a slot of rectangular form opening from one edge of said support, the bearing member having grooves provided in the periphery thereof on diametricaly opposite sides in which portions of said support on opposite sides of said slot are received to limit axial movement of said bearing member with respect to said support and axle, the notches provided in said body being on diametrically opposite sides of said slot and said bearing member having lugs projecting therefrom in the grooves which engage in said notches to prevent outward displacement of said bearing member from said slot.

4. An axle bearing construction as set forth in claim 1 wherein the bearing member comprises a body of generally rectangular form, the opening in said support being a slot of rectangular form opening from one edge of said support, the bearing member having grooves provided in the periphery thereof on diametrically opposite sides in which portions of said support on opposite sides of said slot are received to limit axial movement of said bearing member with respect to said support and axle, the notches provided in said body being on diametrically opposite sides of said slot and said bearing member having lugs projecting therefrom in the grooves which engage in said notches to prevent outward displacement of said bearing member from said slot, there being also a groove in the periphery of said bearing member on a third side interconnecting the first mentioned grooves in which a portion of said support on that side of the slot is also received.

5. An axle bearing construction as set forth in claim 1 wherein the bearing member includes a lateral projection on one side thereof to support said bearing with the axle therein in springable relationship to said support, the means mounting said bearing member on said support being carried on the end of said projection remote from said axle.

6. An axle bearing construrtion as set forth in claim 1 wherein the bearing member includes a lateral projection on one side thereof to support said bearing with the axle therein in springable relationship to said support, the means mounting said bearing member on said support being carried on the end of said projection remote from said axle, the bearing member having a projection on that side thereof toward said support normally in spaced relation to said support but engageable with said support to limit springing movement.

7. An axle bearing construction as set forth in claim 1 wherein the support has a second opening provided therein in spaced relation to the first mentioned opening and the bearing member has oppositely extending projections both connected with said support at their outer ends to mount said bearing in spaced relation to said bearing support and springable relative thereto, the means mounting said bearing member on said support in said openings being carried on the ends of said projections remote from said axle.

8. An axle bearing construction as set forth in claim 1 wherein the support has a second opening provided therein in spaced relation to the first mentioned opening and the bearing member has oppositely extending projections both connected with said support at their outer ends to mount said bearing in spaced relation to said bearing support and springable relative thereto, the means mounting said bearing member on said support in said openings being carried on the ends of said projections remote from said axle, the bearing member having another projection thereon on that side toward the bearing support and normally disposed in spaced relationship thereto but adapted to engage said bearing support ot limit springing movement.

References Cited

UNITED STATES PATENTS

| | | | |
|---|---|---|---|
| 3,083,500 | 4/1963 | Balthazor | 46—221 |
| 3,307,291 | 3/1967 | Cremer | 46—222 |

LOUIS G. MANCENE, *Primary Examiner.*

C. R. WENZEL, *Assistant Examiner.*